(12) United States Patent
Pohlack

(10) Patent No.: US 9,164,754 B1
(45) Date of Patent: Oct. 20, 2015

(54) RUNTIME PATCHING OF NATIVE-CODE PROGRAMS

(71) Applicant: Amazon Technologies, Inc., Reno, NV (US)

(72) Inventor: Martin Thomas Pohlack, Dresden (DE)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/133,515

(22) Filed: Dec. 18, 2013

(51) Int. Cl.
*G06F 9/44* (2006.01)
*G06F 9/445* (2006.01)

(52) U.S. Cl.
CPC .................................... *G06F 8/65* (2013.01)

(58) Field of Classification Search
CPC .............................................. G06F 8/60–8/78
USPC .......................... 717/168–178; 709/220–222
See application file for complete search history.

(56) References Cited

U.S. PATENT DOCUMENTS

| | | | |
|---|---|---|---|
| 7,017,151 B1 * | 3/2006 | Lopez et al. | 717/127 |
| 7,779,401 B2 * | 8/2010 | Scian et al. | 717/168 |
| 2001/0013119 A1 | 8/2001 | Agarwal | |
| 2004/0107416 A1 * | 6/2004 | Buban et al. | 717/170 |
| 2004/0111719 A1 | 6/2004 | Civlin | |
| 2004/0111721 A1 | 6/2004 | Civlin | |
| 2006/0281556 A1 * | 12/2006 | Solomon et al. | 463/43 |
| 2006/0288341 A1 * | 12/2006 | Wurden et al. | 717/168 |
| 2007/0011655 A1 * | 1/2007 | Tumati | 717/122 |
| 2008/0184072 A1 * | 7/2008 | Odlivak et al. | 714/32 |
| 2010/0083224 A1 * | 4/2010 | Arnold | 717/110 |
| 2010/0205587 A1 | 8/2010 | Dai et al. | |
| 2010/0250908 A1 | 9/2010 | Amann et al. | |
| 2010/0269106 A1 | 10/2010 | Arnold | |
| 2012/0054732 A1 | 3/2012 | Jain et al. | |
| 2012/0110558 A1 * | 5/2012 | Anan et al. | 717/140 |
| 2013/0104119 A1 | 4/2013 | Matsuo et al. | |

OTHER PUBLICATIONS

Smirnov et al., Automatic Patch Generation for Buffer Overflow Attacks, 2007 IEEE, pp. 165-170.*
Ekman et al., Dynamic Patching of Embedded Software, 2007 IEEE, pp. 1-9.*

(Continued)

*Primary Examiner* — Satish Rampuria
(74) *Attorney, Agent, or Firm* — Robert C. Kowert; Meyertons, Hood, Kivlin, Kowert & Goetzel, P.C.

(57) ABSTRACT

During execution of a program, a code patching component may insert a redirection patch into a native-code representation of the program. The code patching component may identify a patch area in the native-code representation, copy existing code from the patch area to another location for subsequent emulation by a trap handler, determine the number of instructions and type of native-code elements within the patch area, and replace native-code elements in the patch area with native-code elements representing a jump type instruction and a target address argument for the jump type instruction (directly or indirectly indicating the location of new code that replaces the code in the patch area). The target address argument may be determined by the code patching component based on the program's characteristics, and may include a collection of elements representing existing code, trap type instructions, NOP type instructions, or arbitrary values.

20 Claims, 7 Drawing Sheets

(56) References Cited

OTHER PUBLICATIONS

Henley et al., Helping Programmers Navigate Code Faster with Patchworks: A Simulation Study, 2007 IEEE, pp. 77-80.*

Arnold, Jeff, and M. Frans Kaashoek. "Ksplice: Automatic rebootless kernel updates." In Proceedings of the 4th ACM European conference on Computer systems, pp. 187-198. ACM, 2009.

* cited by examiner

RUNTIME PATCHING OF NATIVE-CODE PROGRAMS

BACKGROUND

Software programs sometimes need to be patched (e.g., to correct an error or implement a new feature) after they have been released and are in use. For example, in systems in which functions, portions of functions or other code segments have been compiled into binary code representations of these functions or code segments, the compiled code sometimes need to be replaced with new code that is compatible with the old code and its data structures. A code patching operation sometimes includes the insertion of code (sometimes referred to as a redirection patch) that redirects execution from one sequence of instructions to another. Some existing techniques for performing binary patching require that all running threads of an executing program are halted while such a code patching operation is performed, e.g., in order to ensure that they are not affected by the patching.

In addition, prior to performing a code patching operation, some existing binary patching techniques must analyze the instruction stream as well as various call stacks and/or other runtime data structures in order to determine whether a code patching operation can be performed without breaking the program being patched. For example, the code patching operation may not be able to be performed if it cannot be determined that there are no entry points within the code being patched for which a return or jump to that entry point prior to completing the patch operation or following the completion of the patch operation will result in incorrect or invalid behavior (e.g., due to an intermediate state that includes an invalid combination of instructions and/or arguments). Some instruction set architectures include instructions of variable lengths, meaning that it may not even be clear where all of the instruction boundaries (and, thus the entry points) in the program being patched are located, which can make such an analysis even more difficult, time consuming, and (in some cases) prone to error.

Figure 1:
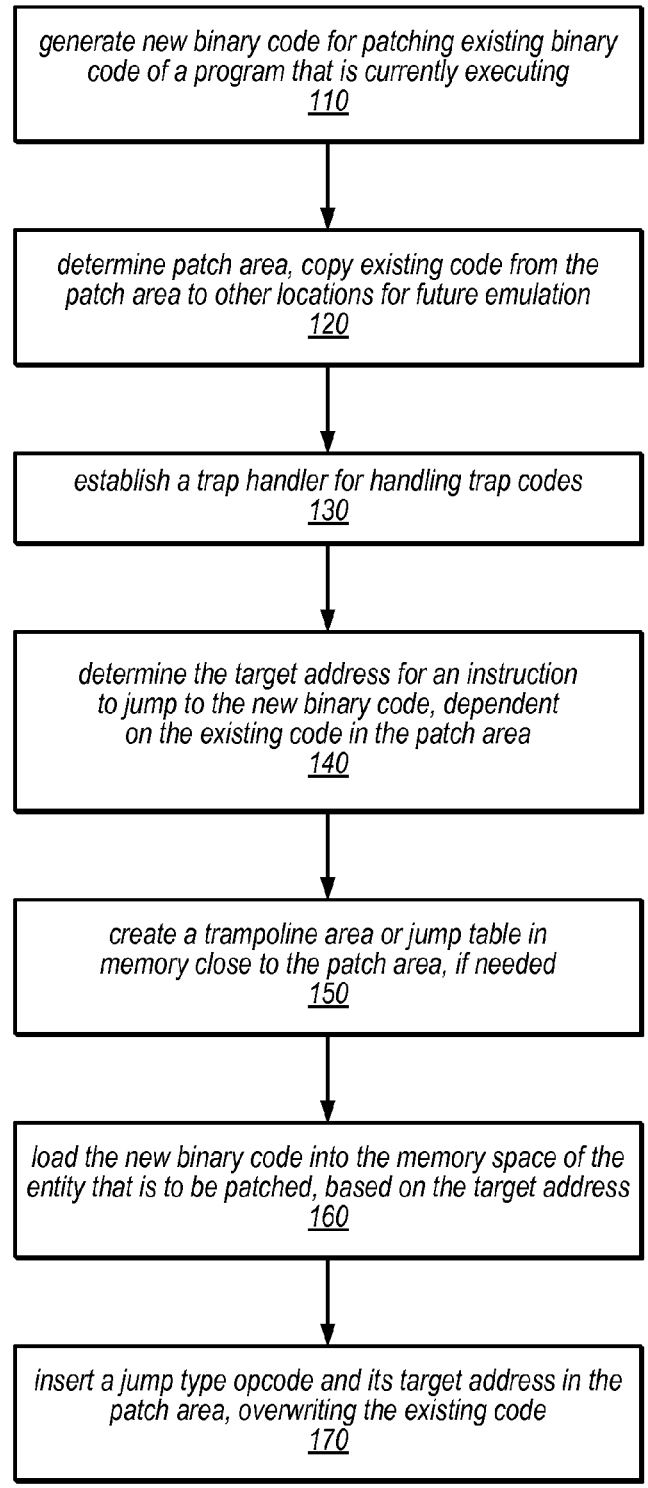
FIG. 1 is a flow diagram illustrating one embodiment of a method for runtime patching of binary code.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The systems and methods described herein may be used to perform runtime patching of native-code program instructions, such as a binary code representation of a portion of an executing program. For example, in various embodiments, native-code instructions representing portions of functions, complete functions, or other program constructs may be replaced by redirection patches, and these redirection patches may include native-code instructions that redirect the execution control flow to new code (e.g., code that implements a new behavior or a new feature, that corrects an error, that fixes a security flaw, etc.).

Unlike with some existing code patching approaches, in some embodiments, the code patching techniques described herein may not require that all other threads be halted while a code patching component of the system (e.g., a software module, or a process or thread thereof, that is configured to perform code patching) replaces a portion of the native-code instructions (e.g., binary code) of a currently executing application. In other words, the techniques described herein may be used to perform runtime patching of native-code programs without having to pause the execution of those programs (or of various processes or threads thereof).

As previously noted, with some existing code patching approaches, in order to avoid a thread returning (or jumping) to the middle of the redirection patch (e.g., to a location within the redirection patch that may no longer correspond to an instruction boundary), all of the locations in which potential return addresses might be stored may need to be inspected before a code patching operation is performed. For example, some existing code patching components must traverse the call stacks of an executing program that is to be patched in order to determine where such return addresses are stored and/or interpret other types of data structures (including arbitrary data structures) in which, e.g., return addresses or target addresses of jump type instructions may be stored.

In some embodiments, the techniques described herein may not require the inspection of the calls stacks of executing threads or processes (or other data structures) when inserting a redirection patch into the code of an executing thread or process. For example, it may not be necessary to understand where threads are currently executing or the locations in the code to which they will or may return (e.g., return addresses that were pushed on their stacks or saved elsewhere). Instead, the code patching techniques described herein may not ensure that no thread or process will be able to return (or jump) to the middle of a redirection patch, but may ensure that for all possible paths to the locations within the redirection patch, a process or thread that reaches those locations will encounter a valid instruction that is part of a defined control flow. In some embodiments, insertion of a redirection patch may not be performed atomically (e.g., it may include multiple write operations), but the code patching techniques described herein may ensure that all the intermediate states of those locations are controlled (e.g., that all the intermediate states represent valid instructions). In some embodiments, a process or thread that reaches the start of a redirection patch whose insertion has been completed may be redirected to new code by a jump type instruction, while a process or thread that reaches the start of a redirection patch whose insertion has not been completed may encounter a trap type instruction that triggers the invocation of an exception handler (e.g., a trap handler that emulates the original code that is being replaced by the redirection patch and then returns to a different location in the original code). Similarly, a process or thread that reaches a location within the redirection patch other than at the start of the redirection patch (e.g., prior to or subsequent to the insertion of the redirection patch being completed) may encounter a trap type instruction that triggers the invocation of an exception handler (e.g., a trap handler that emulates at least a portion of the original code that is being, or has been, replaced by the redirection patch and then returns to a different location in the original code).

In some embodiments, inserting a redirection patch may include modifying a binary representation of the program code in the memory out of which it is executing, while being careful to modify the binary code (which may include variable-length instructions) in such a way that the modified code includes valid instructions that, when executed, result in desired behavior. In other words, the techniques described herein may be used to replace binary elements at a location in the code binary (sometimes referred to herein as a "patch area") with binary elements that will re-direct the control flow to execute a new section of code and then return to the existing code in a way that does not break the existing code. As noted above, in some embodiments, the techniques may include invoking an exception handler (e.g., a trap handler) to emulate at least a portion of the existing code prior to completing the code patching and/or when a thread enters the patch area at a code entry point other than the point at which a redirection instruction (e.g., a jump type instruction) has been inserted in the patch area (e.g., at the start of the patch area). In other words, the systems described herein may operate such that while a code patching operation is in progress, all of the threads or processes of the program being patched continue executing, and in the event that they stumble upon any locations within the area being patched, the instructions in those locations are either still valid and can be interpreted or trigger a controlled trap that will emulate the original code in those locations.

In some embodiments, during execution of a program, a code patching component may insert a redirection patch into a native-code representation of the program. Inserting the redirection patch may include the code patching component identifying a patch area in the native-code representation, and copying the existing code from the patch area to another location in memory (e.g., a location within a table or other data structure in memory out of which it may be subsequently emulated by a trap handler, as described above). In some embodiments, the code patching techniques described herein may be applied to native-code programs in which different instructions may have different lengths. In such embodiments, these techniques may be used to ensure that when replacing existing native-code instructions in the patch area, the tails and/or argument portions of the existing native-code instructions (e.g., instruction parameters such as data, addresses, or register numbers) are replaced with native-code elements that, regardless of how they are interpreted (e.g., as data arguments or instruction opcodes), are valid. In other words, the replacement native-code elements may be chosen such that they represent instructions that are on (or trap to) a controlled execution path. Note that in some embodiments, not all of the native-code elements of the existing code in the patch area may need to be replaced. Instead, one or more of the existing native-code elements in the patch area may be incorporated into the target address portion of a redirection type instruction, as described in more detail below.

In various embodiments, the systems described herein may determine and/or employ any or all of the following when applying runtime patching of native-code programs:

An exception handler (e.g., a trap handler) that is invoked by a trap type instruction (e.g., a particular undefined opcode or break point opcode, such as a binary representation of the UD2 instruction or INT3 instruction of the x86 instruction set). This trap handler may emulate code execution in a way that is equivalent to execution of the original, un-patched code, and may rely on a table or data structure (e.g., a buffer) in which a copy of the original, un-patched code is retained.

A redirection patch that is placed in the location of the original, un-patched code and that redirects the control flow to new code. This patch may be used in one or more locations in the original, un-patched code at which a transition into the new code is desired, for example, in one or more function entry points within the original, un-patched code.

Suitable locations (patch areas) in the original, un-patched code where the redirection patch can be inserted (replacing the original, un-patched code in those locations).

Memory areas in which the new code, which is the direct or indirect target of the redirection patches, is stored.

In some embodiments, the systems described herein may also determine and/or employ one of the following when applying runtime patching of native-code programs:

An intermediate trampoline area, in a suitable location in memory, that connects a redirection patch and the new code that is to be executed in place of the original, un-patched code. In embodiments in which such a trampoline area is used, redirection code in the trampoline area may be identified by the immediate argument of the redirecting code (e.g., a jump type instruction) in the redirection patch. In other words, if a trampoline area is necessary, control flow may be redirected from the installed redirection patch to the trampoline area, from which it may be further redirected to the new code that replaces the original, un-patched code. If trampolines are not used, control flow may pass directly from a redirection patch to the new code that is to be executed in place of the original, un-patched code.

A jump table, in a suitable location in memory, that contains the address of the new code that is to be executed in place of the original, un-patched code. In embodiments in which such a jump table is used, the immediate argument of the redirecting code (e.g., a jump type instruction) in the redirection patch may identify the address of the particular slot in the jump table that contains the address of the new code.

In some embodiments, the redirection patch may contain a jump type instruction that includes an instruction (opcode) portion and a parameter portion. In such embodiments, the parameter portion may contain the target address for the jump type instruction, which may either directly or indirectly (e.g., through a trampoline area or jump table) identify the location of the new code that replaces the original, un-patched code. In many (if not most) cases, the threads or processes of a program that is being patched using the techniques described herein will not interfere with the process of patching the code, and will simply be redirected to the new code whenever it attempts to execute the newly patched parts of the original code path. In some embodiments, execution threads that are in the middle of a patch area during the code patching process or that later return to a location in the patch area may trigger a trap, causing execution of at least a portion of the original code in the patch area to be emulated by a trap handler, as described above. In some such embodiments, those threads may execute the old code path once more (including the portions of the original code that are emulated by the trap handler), but after leaving the patch area, execution may resume natively (e.g., along patched or un-patched code paths of the newly patched program).

In some embodiments, runtime patching of a native-code program may include choosing addresses for the new code, for a trampoline area, or for a jump table whose byte representation can to also be interpreted as include a native-code (e.g., binary) representation of one or more trap type instructions at relevant locations. As described in more detail below, in some embodiments, runtime patching of a native-code program may include determining the number of instructions and/or types of native-code elements in the original, un-patched code within the patch area, and replacing the native-code elements in the patch area with native-code elements representing a jump type instruction and a target address argument for the jump type instruction that directly or indirectly indicates the location of new code that replaces the original, un-patched code in the patch area. In some embodiments, the target address argument may be determined by the code patching component based on the program's characteristics, and may include a collection of elements representing one or more of the existing elements in the patch area, one or more trap type instructions, no-operation (NOP) type instructions, and/or arbitrary values.

In some embodiments, runtime patching of a native-code program may include loading the new code into the target entity (e.g., into the memory space of the program, process, or kernel being patched), and establishing and/or registering a trap handler for handling any traps that may occur as a result of a thread entering the patch area during or after the insertion of a redirection patch in the patch area. In some embodiments, establishing and/or registering the trap handler may be performed by a signal handler and/or may include writing to an interrupt description table or another data structure, depending on the trap destination.

In some embodiments, depending on the architecture and the jump type instructions that are available for use in a redirection patch, the redirection code may be limited in terms of how far away the control flow can be redirected (relative to the patch area). In cases in which the new code can be located very close to the patch area (and the jump type instruction thereof), a simple jump operation may suffice, because it may be used to reach the new code. In other cases, runtime patching of a native-code program may include creating or defining a small trampoline area near the patch area (e.g., one of one or more small areas located at various points within the original, un-patched code that may initially be empty, but that may be used to specify a single indirection for the target address argument of a jump type instruction, identifying a location that is reachable within the limits of the jump type instruction. In still other cases, runtime patching of a native-code program may include creating and/or defining an entry in a jump table identifying a location that is reachable within the limits of a jump type instruction. For example, a trampoline area may contain code that loads the absolute address of the new code into a register and then does an indirect jump to the address that was loaded into the register, while a jump table may be a data structure that contains the absolute address of the new code that may be reached using an indirect jump type instruction that points to the particular slot in the jump table that stores the absolute address of the new code. In various embodiments, these or other techniques may be employed in cases in which the new code cannot be located in the memory space close enough to the patch area to be able to reach the new code using a simple jump instruction.

As described in more detail below, runtime patching of a native-code program may include adding the jump type instruction and the parameters identifying the target address for the jump type instruction into the instruction stream (e.g., writing a native-code representation of the jump type instruction and its target address argument into the patch area of the memory space of the executing program, overwriting the original, un-patched code).

Note that the code patching techniques described herein may, in various embodiments, be performed by a code patching component of an operating system, hypervisor, debugger, or other privileged program or process that is invoked automatically (e.g., in response to detection of an error in self-correcting code) or in response to an explicit invocation of a code patching operation by programmer, system administrator or other privileged user or process owner. In some embodiments, a compiler or another component of an operating system, hypervisor, debugger, or other privileged program or process may be configured to prepare a program for the potential application of the code patching techniques described herein by pre-allocating various locations within the memory space of the program into which new code, trampoline code, jump tables, or other data structures may be written as part of a code patching operation.

One embodiment of a method for performing runtime patching of native-code programs (e.g., binary code) is illustrated by the flow diagram in FIG. 1. As illustrated at 110, in this example, the method may include generating new binary code for patching the existing binary code of a program that is currently being executed in a computing system. The method may include determining the locations at which to patch the existing code (e.g., a patch area containing multiple contiguous locations in the memory space of the executing program), and copying the existing binary code from the patch area to another group of contiguous locations in the memory space of the executing program out of which they may be subsequently executed (e.g., during a future emulation of the existing code by a trap handler), as in 120.

As illustrated in this example, the method may include establishing (and/or registering) a trap handler for handling trap codes, as in 130. The method may also include determining the target address argument for an instruction to redirect the execution to the new binary code (e.g., a jump type instruction). As described in more detail herein, this determination may be dependent on the existing code in the patch area, as in 140. The target address argument may be used to directly or indirectly locate the new binary code, and may be subject to various restrictions (as described below).

As illustrated at 150, in this example, the method may include creating a trampoline area or jump table in memory close to the patch area, if needed. For example, if the new binary code cannot be located close enough to the patch area to be within limits of an available jump type instruction, a level of address indirection may be introduced by way of a trampoline area or jump table, in different embodiments. The method may also include loading the new binary code into the memory space of the entity that is to be patched, based on the determined target address argument (as in 160), and inserting a binary representation of a jump type instruction (including a jump type instruction opcode and its determined target address argument) in the patch area, overwriting the existing code in the patch area (as in 170).

Note that in various embodiments, at least some (if not all) of the operations illustrated in FIG. 1 may be performed during execution of the entity being patched. Note also that the operations illustrated in FIG. 1 may be performed in a different order than that illustrated in FIG. 1, in different embodiments. For example, in embodiments in which a jump table, trampoline area, or another type of indirect addressing is used to redirect the execution flow to the location of the new binary code, the new binary code may be loaded into memory prior to copying out the existing code and/or determining the target address for the jump type instruction. In another example, the method may include establishing the trap handler at any point prior to inserting the representation of the jump type instruction in the patch area, including, but not limited to, the point shown in FIG. 1.

As noted above, inserting the redirection patch into the patch area may include writing both a jump type instruction opcode and its target address argument into the patch area. In some embodiments, these write operations (e.g., the values written to the patch area) may be dependent on the specific locations within the patch area where each of the individual bytes of the jump type opcode and its target address argument would land with respect to the instruction boundaries in the existing code that will be overwritten. This is because these instruction boundaries may potentially correspond to locations at which other threads could be currently executing or at which they could begin or resume execution (e.g., they may correspond to return addresses or targets of other jump or branch type instructions).

In some cases, in a stream of bytes (i.e., in an instruction stream that is being patched), the memory locations in the patch area where the redirection patch (which includes both a jump type instruction opcode and its target address argument) is to be inserted may contain a binary code representation of a single instruction. In some embodiments, runtime patching of a native-code program may include overwriting the binary code representation of this single instruction with a binary code representation of the redirection patch in a single step (which may or may not be performed atomically), since the only possible way that another thread would enter the patch area (to begin or resume execution) would be to enter the patch area at the start of the redirection patch (e.g., at the location containing the first byte of the jump type instruction opcode).

However, in other cases, in a stream of bytes (i.e., in an instruction stream that is being patched), the memory locations in the patch area where the redirection patch (which includes both a jump type instruction opcode and its target address argument) is to be inserted may contain binary code representations of multiple instructions. For example, the redirection patch may be five bytes long (e.g., it may include a 32-bit relative jump instruction that includes one byte for the opcode and four bytes for a signed address) or nine bytes long, and the portion of the underlying instruction stream that will be overwritten by the redirection patch may include binary code representations of up to five or nine independent instructions (e.g., if each instruction is shorter than the redirection patch). As noted above, the binary code at the beginning of each instruction in the stream (i.e., the binary code at each instruction start boundary) may potentially be subject to execution by another thread (e.g., a thread returning or jumping into that location to start executing there). In the extreme case, each of the individual locations in the patch area that are to be overwritten by the redirection patch may represent a different potential location into which a thread can jump or return. In some embodiments, runtime patching of a native-code program may include overwriting the binary code in one or more of the locations in the patch area with binary code representations of one or more trap type instructions (e.g., as part of the target address argument of the redirection patch) in such a way that a trap will be taken when a thread enters the patch area at any of these instruction boundaries. In other words, in some embodiments, writing the target address argument portion of the redirection patches may include writing a binary code representation of a target address argument in which the individual bytes of the target address argument that land at the beginning of one or more of the instructions being overwritten will be subsequently interpreted as trap type instructions. For example, they may represent illegal instructions that will be trapped, or may represent interrupt or trap type instructions that are defined in the native programming language of the program being patched.

In some embodiments, the individual bytes of the target address argument may be written to the patch area one at a time, as long as for each instruction in the code being overwritten, the first byte of the trap type operation that replaces it is written first. In other words, once the bytes of the target address argument portion of the redirection patch that will land on instruction boundaries in the code being overwritten have been identified, they may be written to the patch area, and the values of bytes may be restricted such that for any byte that could be interpreted as the beginning of an instruction (by a thread entering the patch area at that location), entering the patch area at that location will lead to a trap. Once these bytes have been written, all execution flows that enter the patch area at what was previously an instruction boundary may be caught and redirected to a trap handler.

In some embodiments, once all of the bytes of the target address argument portion of the redirection patch that will land on instruction boundaries in the code being overwritten have been identified and written, any remaining bytes of the target address argument portion of the redirection patch may be written. In some embodiments, this step may be merged with the previous step if atomic copying operations are available. In some embodiments, after all of the bytes of the target address argument portion of the redirection patch have been written in the patch area, a jump type opcode may be patched over the old instructions at the beginning of the patch area, along with any remaining portions of the target address argument that land in a location spanned by the same instruction that is being replaced by the new jump type instruction. Note that in some embodiments, the beginning of the jump type instruction (e.g., the first byte of the jump instruction opcode) must be aligned to beginning of an existing instruction in the patch area (i.e., an instruction start boundary). In some embodiments, the binary representation of the jump type instruction may be inserted in the patch area using an atomic operation. In embodiments in which an atomic copy operation is not available, the first byte of the binary representation of the jump type instruction may be temporally replaced with a binary representation of a trap type instruction, after which the target address portion of the redirection patch may be written using multiple byte-wise writes. In such embodiments, once the target address portion of the redirection patch has been written, the binary representation of a trap type instruction may be replaced by the opcode for the jump type instruction. Note that in some embodiments, if suitable atomic operations are available, this step may be combined with the previous patching steps (e.g., those that overwrite other instructions in the patch area with binary representations of trap type instructions).

Figure 2:
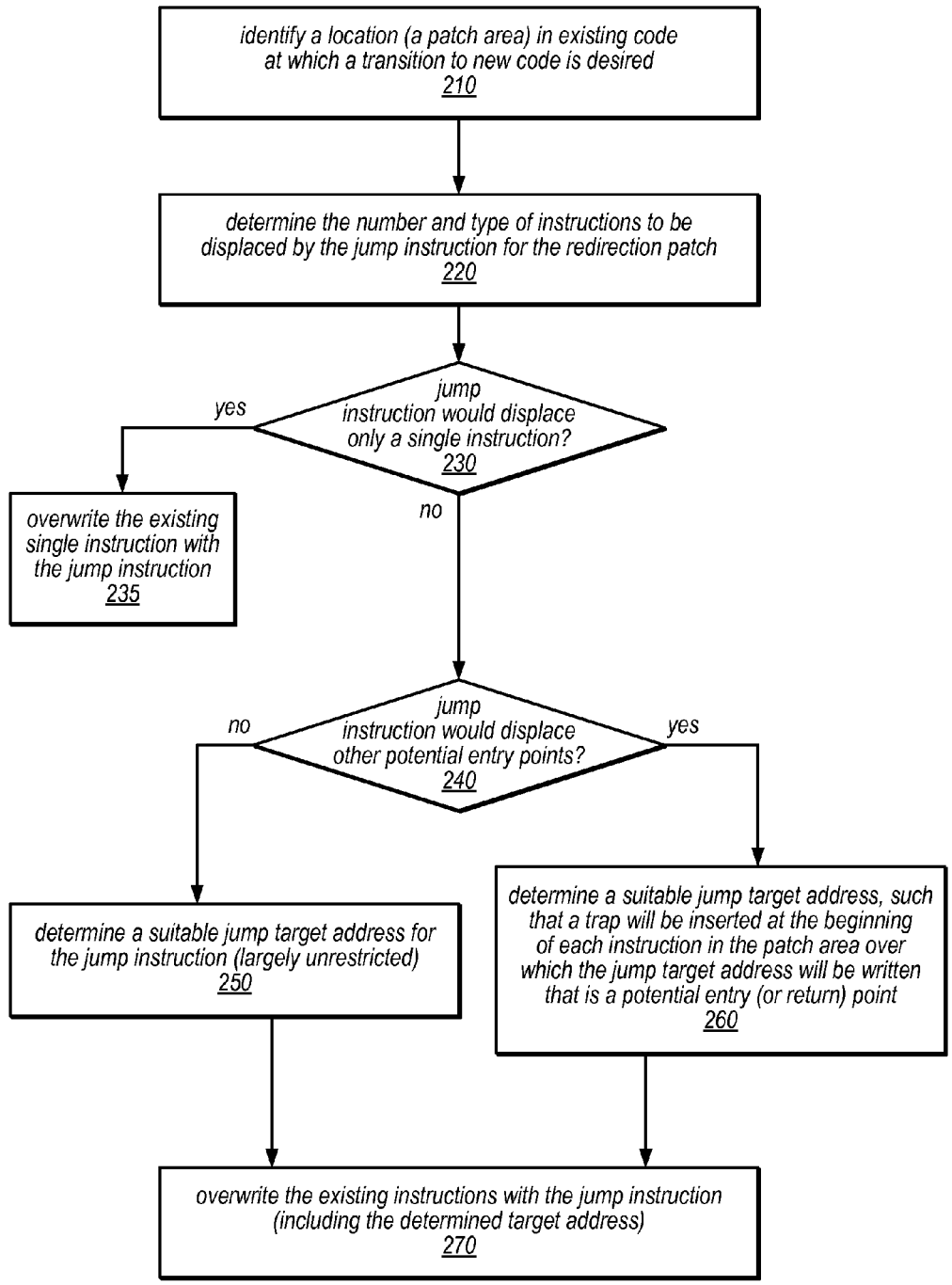
FIG. 2 is a flow diagram illustrating one embodiment of a method for inserting a jump instruction for a redirection patch into binary code.

One embodiment of a method for inserting a jump instruction for a redirection patch into binary code is illustrated by the flow diagram in FIG. 2. As illustrated at 210, in this example, the method may include identifying a location (e.g., a patch area) in existing code at which a transition to new code (e.g., a redirection patch) is desired. For example, e.g., the patch area may include code for a particular function or code sequence that is to be replaced with new code in order to implement a new behavior or a new feature, to correct an error, to fix a security flaw, or for other purposes. The method may include determining the number and type of instructions to be displaced by the jump instruction for the redirection patch (including its parameters, e.g., a direct or indirect target address), as in 220. As noted above, the patch area may include code representing a single instruction (e.g., a single entry point) or multiple instructions (e.g., multiple potential entry points), which may restrict the choice of a target address argument for the jump type instruction of the redirection patch and/or the number or order of the write operations used to insert the redirection patch. Note that in some embodiments, if the redirection patch will overwrite only a portion of an existing instruction whose binary representation crosses a boundary of the patch area, additional code elements (e.g., code element that will not be overwritten by the redirection patch) may need to be overwritten in the existing code (e.g., if they represent potential entry points in the instruction stream that would behave differently following the insertion of the redirection patch).

As illustrated in this example, if the jump instruction (including its parameters) would displace only a single instruction in the existing code (shown as the positive exit from 230), the method may include overwriting the existing single instruction with the jump instruction (as in 235). As noted above, in some embodiments the jump instruction (including its parameters) may be written to the patch area atomically. In some embodiments, if the jump instruction replaces only a single instruction, there may be no restrictions on the value of the target address argument (other than a possible limit on the jump distance), except under relatively rare conditions. However, if the jump would displace multiple individual instructions, or portions thereof (shown as the negative exit from 230), but the jump instruction would not displace any other potential entry points into the existing code (shown as the negative exit from 240), the method may include determining a suitable target address for the jump instruction, which may be free from any restrictions (as in 250).

In this example, if the jump would displace multiple individual instructions, or portions thereof (shown as the negative exit from 230), and if the jump instruction would also displace one or more other potential entry points into the existing code (shown as the positive exit from 240), the method may include determining a suitable target address for the jump instruction, such that a trap will be inserted at the beginning of each instruction in the patch area over which the jump target address will be written that is a potential entry (or return) point in the existing code (as in 260). As illustrated in this example, the method may also include overwriting the existing instructions in the patch area of the memory space of the existing program with the jump instruction (including the determined target address), as in 270. As in other examples described herein, at least some (if not all) of the operations illustrated in FIG. 2 may be performed during execution of the program that is being patched, in various embodiments.

As illustrated in FIG. 2 and in other examples described herein, in some embodiments, the target address argument portion of the jump type instruction may be subject to various restrictions based on the existing code that will be overwritten by the redirection patch. In one example, if each of the four last existing instructions in a patch area is one byte long, and the four locations in the patch area will be overwritten by the target address parameter of the jump instruction that is being patched in, then the possibilities for the target address parameter may be restricted such that each of the four bytes of the target address parameter may need to correspond to a binary code representation of an instruction that will cause a trap (e.g., an INT3 instruction). In this example, if there is only a single instruction in the native programming language that is one byte long and that will trap, there may only be one target address parameter that can be included in the redirection patch, thus only one location to which the execution control flow can be redirected.

In another example, the redirection patch may overwrite multiple instructions, but the target address parameter portion of the redirection patch may overwrite only a single instruction. In this case, in some embodiments, only the first byte(s) of the target address parameter may be limited to a value that corresponds to a binary code representation of an instruction that will cause a trap (e.g., a single-byte INT3 instruction or a two-byte UD2 instruction), while the choice of values for the remaining bytes of the target address parameter may not be restricted (e.g., since the locations of those bytes in the patch area do not correspond to a potential entry point). In various embodiments, the number of bytes of the target address parameter portion of a redirection patch for which the values are restricted and/or the restrictions that are applied to each of those bytes may be dependent on the native instruction set of the program being patched and the number of trap type instructions it includes, the address space layout for the program being patched, and/or the exact location(s) within the patch area that are to be overwritten by the target address parameter (e.g., the existing code in those locations). In some embodiments, the location of the patch area and/or the particular locations within the patch area that are to be overwritten by the target address parameter may be chosen relatively freely (i.e., without many restrictions). In some embodiments, the careful selection of the patch area and/or the particular locations within the patch area that are to be overwritten by the target address parameter may make the determination of appropriate values for the bytes of the target address parameter less restrictive. For example, one potential patch area may include five small instructions, in which case the options for the target address parameter for the redirection patch may extremely limited. However, by placing the redirection patch a little bit ahead of or behind that potential patch area (and, in some cases, padding the beginning or end of the patch area with bytes representing one or more no-operation type instructions), there may be different numbers and/or types of instructions in the patch area that allow for more freedom in choosing the target address parameter.

In general, if any of factors that increase the restrictions on the choice of the target address parameter (including those described above) do not apply, there may be much more freedom in choosing the target address parameter for a redirection patch. For example, in an architecture in which the native instruction set includes multiple trap type instructions, multiple ones of these trap type instructions may be combined in different ways, resulting in multiple potential target addresses from which to choose. In another example, if an alternate patch area is identified that does not include as many small instructions as an initially identified patch area, fewer bytes of the target address parameter (e.g., only the bytes that replace the first byte of each instruction in the existing code) may be restricted to a binary code representations of a trap type instruction. In this case, there may be more freedom in the choice of values to replace the rest of the bytes of each instruction (including its arguments) with arbitrary values that make up the rest of the target address parameter for the jump type instruction of the redirection patch. As noted above, in some embodiments one or more bytes of the existing code in the patch area may not be replaced in the patch area, but may be incorporated into the target address parameter for the redirection patch, if suitable. In such embodiments, this may increase the freedom in choosing the target address parameter for the redirection patch since it may result in increased freedom in the selection of the address space into which the existing code will be copied for subsequent emulation. Note that in at least some embodiments, this may be a safe approach, since the emulation code would replicate the exact behavior of the original (existing) code (including any such bytes that are not replaced in the patch area).

Again note that if there is an atomic operation available for inserting the entire redirection patch in a single operation, the entire new byte sequence to be written in the patch area (i.e., the redirection patch to be written over the existing code in the patch area) may be computed before any of the bytes of the new byte sequence are written into the patch area. In other words, a target address argument for a particular jump type instruction may be constructed that includes a binary code representation of one or more trap type instructions (if needed), one or more of the existing binary code elements existing in the patch area, and/or other binary code elements (e.g., arbitrary values) that are chosen such that they collectively form a valid (and available) direct or indirect target address parameter for the jump type instruction, and then the existing code in the patch area may be replaced with binary code for the jump type instruction and the constructed target address parameter in a single atomic operation. In some embodiments, if the binary code for the existing instructions in the portion of the patch area that is to be replaced with a target address parameter for a jump type instruction happen to form a valid, available address, this binary code may not need to be replaced in the patch area (i.e., only the jump type instruction may need to be written in the patch area). In this case, if another thread entered the patch area in the un-changed portion of the patch area (or was already executing there) it may interpret the binary code in that portion of the patch area as the old code. However, the next time a thread entered the patch area at the beginning of the redirection patch (as if to execute the code in the patch area straight through from that point), it would jump to the new code because the jump instruction that was inserted at the beginning of the patch area would interpret those same bytes as its target address parameter.

As described above, one limitation of the code patching techniques described herein may be that the code patching component needs to identify a suitable location for the placement of trampoline code, a jump table, a trap handler and/or new code that replaces the code in the patch area, and the choice of locations for some or all of these elements may in some cases be somewhat (or severely) limited by various restrictions on the encoding of the target address parameters described above. Note that in some embodiments, the location of the trap handler may not be subject to the same address restrictions as the locations of the replacement (new) code, trampoline code and/or jump tables. As described above, in some embodiments, the limitations on the target address parameters (which may include address parameters that either directly redirect execution to the new code, or indirectly directly redirect execution to the new code through either trampoline code pages or jump tables) may be reduced in several ways, including, but not limited to, one or more of the following:

- The use of several distinct trap type instructions.
- The replacement of only the first byte(s) of each old instruction with a trap type instruction (leaving the remaining bytes to be chosen more freely, i.e., with fewer restrictions).
- The choice of a patch area that includes fewer and/or larger instructions than other potential patch areas.

In some embodiments, the limitations on the target address parameters (which may include address parameters that either directly redirect execution to the new code, or indirectly redirect execution to the new code through either trampoline code pages or jump tables) may be reduced in several other ways, including, but not limited to, one or more of the following:

- The use of little endian encoding of addresses, which, when used in combination with only replacing the first byte(s) of each old instruction, may provide statistically more freedom in choosing the higher order bytes of the target address parameter, allowing for larger address space areas for the potential placement of trampoline code, a jump table, a trap handler and/or new code.
- The use of various encodings for no-operation instructions (NOPs), rather than trap type instructions, for all but the last patched byte of the target address parameter. In some embodiments, trapping on the last byte of the target address parameter may be sufficient to ensure that all code executing in the patch area itself is eventually trapped and emulated. Note that, in general, this approach may only be suitable for in situations in which there are trailing, idempotent instruction sequences in the original code that can be replayed again in the trap handler. Note also that, in some such embodiments, the trap instruction may actually be located outside of the redirection patch (e.g., immediately following the bytes that make up the target address parameter of the jump type instruction).

Figure 3:
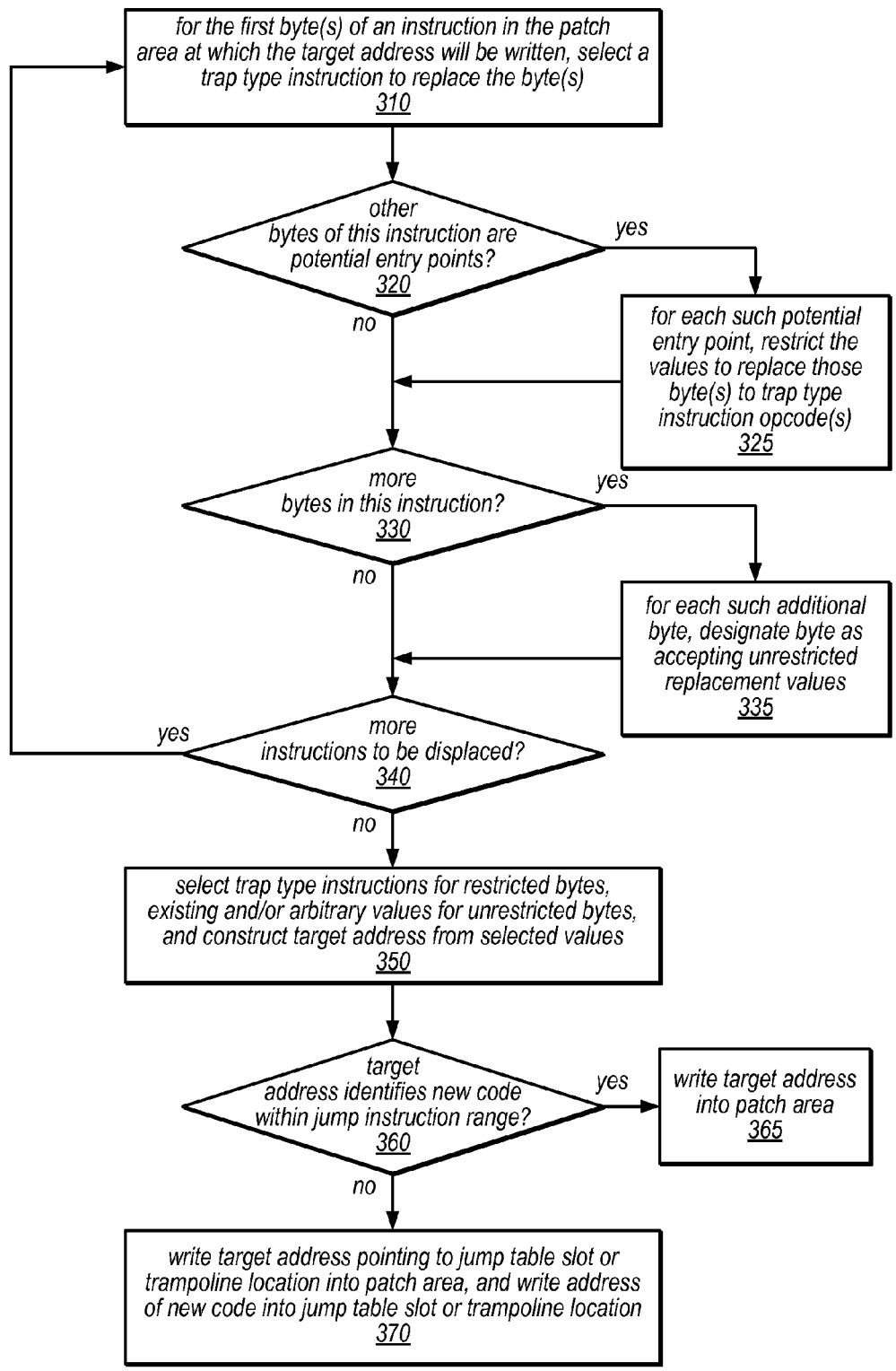
FIG. 3 is a flow diagram illustrating one embodiment of a method for determining a target address for a jump instruction in a redirection patch.

One embodiment of a method for determining a target address for a jump instruction in a redirection patch is illustrated by the flow diagram in FIG. 3. As illustrated at 310, in this example, the method may include, for the first byte (or bytes) of an instruction in the patch area at which the target address will be written (which may be considered a restricted byte), selecting a trap type instruction to replace the byte. If any other bytes of this instruction are potential entry points into the patch area (e.g., as a return address or as a target of a branch or jump type instruction from outside the patch area), the method may also include, for each such byte, restricting the values that can be selected to replace those byte(s) to trap type instruction opcodes. This is illustrated in FIG. 3 by the positive exit from 320 and element 325.

If there are more bytes in this instruction (shown as the positive exit of 330), the method may include, for each such additional byte, designating those bytes as bytes for which the replacement values for those bytes within the patch area may be unrestricted (i.e., these bytes may be considered an unrestricted byte), as shown at 335. For example, in various embodiments, the values selected during replacement of these unrestricted bytes in the patch area may include one or more existing instruction elements in the patch area, bytes representing one or more NOP type instructions, and/or one or more arbitrary values. As illustrated in this example, if there are more instructions to be displaced by the redirection in the patch area (shown as the positive exit from 340), the method may include repeating the operations illustrated in

310-340, as applicable, for each additional instruction to be displaced. If there are no additional instructions to be displaced (or once the operations in 31-340 have been repeated for each such instruction, as applicable), the method may include selecting trap type instructions (for replacement of any restricted bytes), selecting existing values and/or arbitrary values (for replacement of any unrestricted bytes), and constructing a target address to which execution will be redirected from the selected values, as in 350.

If the target address can be constructed such that it can identify the location of the new code being patched into the software entity being patched and such that the location of the new code is within the range of the jump instruction to be inserted at the beginning of the patch area as part of the redirection patch (shown as the positive exit from 360), the method may include writing the target address into the patch area (as in 365). If not, the target address may be constructed such that it identifies a nearby jump table slot or trampoline location at which a pointer (or another redirection mechanism) identifying the location of the new code is stored. In this case, the method may include writing the target address that points to the jump table slot or trampoline location into the patch area, and writing the address of the new code into the jump table slot or trampoline location (as in 370). As in other examples described herein, at least some (if not all) of the operations illustrated in FIG. 3 may be performed during execution of the program that is being patched, in various embodiments.

In some cases, e.g., for representations of programs for which the particular native-code instruction set includes instructions of variable length, it may not always be clear where the instruction boundaries are in the existing native-code representation of a program that is to be patched. In some such cases, a particular byte sequence might be interpreted (correctly) in different ways (as one of multiple different valid instruction streams) depending on where execution of the byte sequence began. The deliberate inclusion of such ambiguous code may be extremely rare (e.g., it may be limited to various high-security, digital-rights management, military, or malware applications in which an attempt is made to hide the actual instruction stream, or to at least make it difficult to detect). In these cases, a static inspection of the code may not necessarily reveal the instruction boundaries of the actual byte sequence (i.e., the byte sequence that is meant to be executed). In some embodiments, if it is known (or suspected) that such ambiguous code is included in a patch area, the code patching component may need to treat every byte in the patch area as if it were a potential entry point for another thread (e.g., by replacing it with a trap type instruction). As noted above, this may severely restrict the options for the target address that can be chosen for the jump type instruction of the redirection patch. Alternatively, the code patching component may insert a trap type instruction only in the last byte of the portion of the patch area in which the target address is written, and may replace all of the other bytes of the portion of the patch area in which the target address is written (i.e., those that preceded the location in which the trap type instruction is written) with NOP type instructions, in some embodiments. In this case, the code patching component may write the NOP type instructions and the single trap type instruction in the patch area as part of a single atomic operation.

A similar approach may be applied when patching code that is not ambiguous, but that includes an idempotent instruction sequence (e.g., a sequence of instructions that can be replayed in part or as a whole without changing the functional outcome). In other words, in some embodiments, in the case that the patch area includes a sequence of instructions for which the functional outcome is independent of whether it is replayed once or multiple times and/or execution begins at an instruction boundary at the start of the patch area or at another instruction boundary in the middle of the patch area that is a potential entry point into the patch area, the code patching component may insert a trap type instruction only in the last byte of the portion of the patch area containing this sequence of instructions, and may replace all of the other bytes of that portion of the patch area with NOP type instructions. In this case, a thread entering the patch area at a location in which an instruction in this sequence of instructions has been replaced by a NOP instruction will execute that NOP instruction, and (in some cases) one or more other ones of the NOP instructions (if any are present in the code path between the entry point and the trap type instruction) and will eventually encounter the trap type instruction. In such embodiments, the same trap handler may be invoked regardless of where a thread entered this portion of the patch area (e.g., at the location of a first, second, or subsequent NOP type instruction in the target address portion of the redirection patch or at the location of the trap type instruction), and the trap handler may emulate all of the code that was copied from this portion of the patch area in response to the trap being taken.

In some embodiments, this approach (e.g., replacing only the last byte of the portion of the patch area that includes the target address parameter with a trap type instructions, replacing all other bytes of that portion of the patch area with NOP type instructions, and replaying all of the original instructions that were copied from that portion of the patch area regardless of the entry point of an executing thread) may not be suitable in situations in which the functional outcome of the original code would be different depending on the point at which a thread entered the patch area. However, in other embodiments, the trap handler may be configured to determine the point at which a thread entered the patch area and to replay only the portion of the original instructions that would have been executed if the thread entered the patch area at that point in the original instruction sequence. For example, in some embodiments, the trap handler may be configured to inspect the local call stack to determine whether the entry point corresponded to the location of a particular one of the NOP type instructions or the trap type instruction. In another embodiment, the trap handler may be configured to take advantage of the existence of an advanced feature of the CPU, such as by inspecting a branch trace buffer, in which information about the last branch taken would be captured.

In still other embodiments, the trap handler may be configured to inspect the copy of the original code of the patch area to determine whether it is safe to replay all of the code in this portion of the patch area (e.g., starting at the first NOP type instruction) regardless of the actual entry point of thread that eventually encountered the trap type instruction (e.g., to determine whether it makes a functional difference where the thread would have entered that portion of the original code). For example, if the first instruction in that portion of the original code cleared a register, and a subsequent instruction in that portion of the original code writes another value to the register, the trap handler may determine that clearing the register prior to writing the other value would not make any functional difference to the program as a whole. In other words, if the actual entry point were the location of the subsequent instruction, the result of the emulation of the original code by the trap handler would be the same regardless of whether or not the first instruction is executed or skipped, and the trap handler may determine that it is safe to execute the first instruction regardless of the actual entry point. However, if the first instruction in that portion of the original code performed an action that was visible to (and represented a dependency of) another thread or instruction sequence, the trap handler may determine that it is not safe to execute this instruction if the entry point corresponds to different (subsequent) one of the instructions in that portion of the original code.

Figure 4:
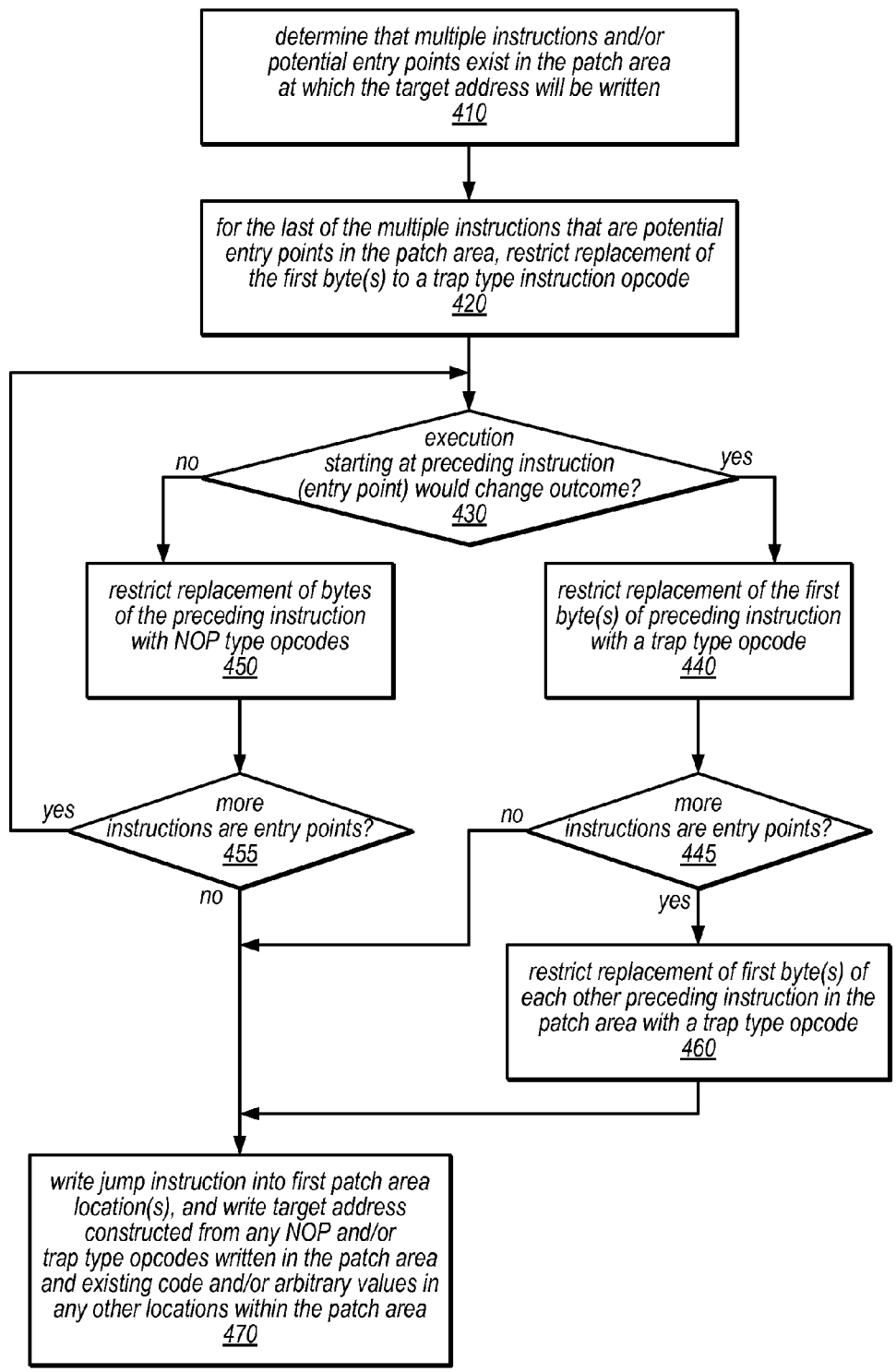
FIG. 4 is a flow diagram illustrating one embodiment of a method for replacing some bytes in a patch area with "no operation" (NOP) type instructions.

One embodiment of a method for replacing some bytes in a patch area with "no operation" (NOP) type instructions is illustrated by the flow diagram in FIG. 4. As illustrated at 410, in this example, the method may include determining that multiple instructions and/or potential entry points exist in the existing code in the portion of the patch area at which the target address will be written. The method may also include, for the last of the multiple instructions that are potential entry points in the patch area, restricting the replacement of the first byte (or bytes) of the instruction to a trap type instruction opcode, as in 420. If executing the existing code starting at the immediately preceding instruction or entry point would not change the outcome of the execution (when compared to executing the existing code starting at the instruction or entry point that is being replaced by the trap type instruction opcode), the method may include restricting the replacement of some or all of the bytes of the preceding instruction with NOP type opcodes. This is illustrated in FIG. 4 by the negative exit from 430 and 450. In this case, if there are more instructions that are potential entry points in the existing code in the portion of the patch area at which the target address will be written (shown as the positive exit from 455), the method may include repeating the operations illustrated in 430-460, as applicable, examining each additional instruction that is a potential entry point and that precedes the instructions (entry points) examined so far, and replacing various bytes of those instructions as determined by these operations.

If executing the existing code starting at the immediately preceding instruction or entry point would change the outcome of the execution (when compared to executing the existing code starting at the instruction that is to be replaced by the trap type instruction opcode), the method may include restricting the replacement of the first byte (or bytes) of the preceding instruction with a trap type opcode. This is illustrated in FIG. 4 by the positive exit from 430 and 440. In this case, if there are more instructions that are potential entry points in the existing code in the portion of the patch area at which the target address will be written (shown as the positive exit from 445), the method may include restricting the replacement of the first byte (or bytes) of each other one of the preceding instructions in this portion of the patch area with a trap type opcode, as in 460.

As illustrated in this example, once all of the instructions and/or potential entry points in the existing code in the portion of the patch area at which the target address will be written have been examined and various bytes in this portion of the patch area have been replaced by trap type opcodes and/or NOP type opcodes (shown as the negative exits from 445 and/or 455), the method may include writing a value representing a jump instruction (e.g., a jump type opcode) into the first byte (or bytes) of the patch area, and writing a target address constructed from any NOP and/or trap type opcodes written in the patch area, along with any suitable existing code elements and/or arbitrary values chosen to replace the existing code in any remaining locations within the patch area, to the patch area as a direct or indirect address argument for the jump type opcode (as in 470). As in other examples described herein, at least some (if not all) of the operations illustrated in FIG. 4 may be performed during execution of the program that is being patched, in various embodiments.

As noted above, in some embodiments, the code patching techniques described herein may employ a trap handler that is configured to execute all or a portion of the original code that was previously located in the patch area (emulating the behavior of the original code) under certain circumstances. For example, if a process or thread has already entered the patch area prior to completion of the code patching operation, or if a process or thread returns or jumps into the middle of the patch area (e.g., to the location of an entry point than the entry point at the start of the patch area) during or subsequent to a code patching operation, it may encounter a trap type instruction that was written to a location within the patch area as part of the code patching operation. In some embodiments, the trap handler that is invoked in response may be configured to execute at least a portion of the original code (e.g., out of the memory locations into which it was copied as part of the code patching operation) such that the behavior of the program being patched does not change until after the code patching operation has been complete. Note that in some embodiments, once the code patching operation has been completed, any process or thread that enters the patch area will enter the patch area at the beginning of the redirection patch (e.g., at the location of the jump type instruction of the redirection patch), at which point it will jump to the new code that replaces the code originally located in the patch area.

In some embodiments, it is possible that, even after the code patching operation has been completed, a process or thread may return or jump into the middle of the patch area (e.g., to the location of an entry point than the entry point at the start of the patch area) multiple times, in which case the process or thread would repeatedly encounter a trap type instruction and the trap handler would repeatedly emulate at least a portion of the original code before returning to another location in the patched program. In other words, in some embodiments, the emulation mechanism provided by the trap handler may remain in place indefinitely in order to correctly handle this possibility.

Figure 5:
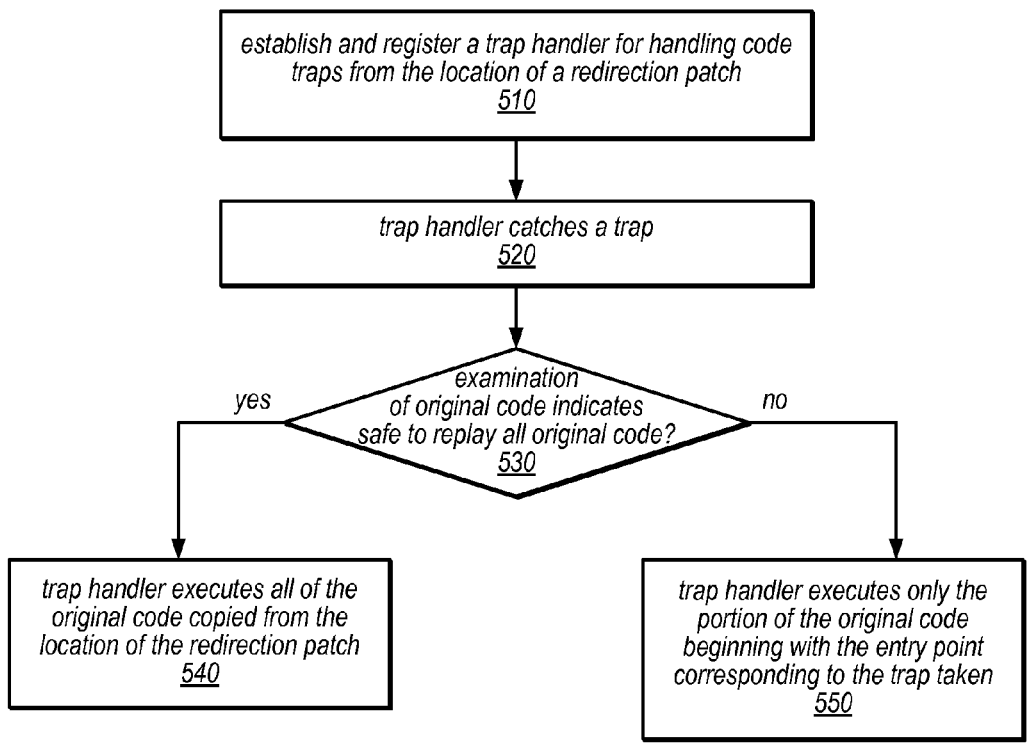
FIG. 5 is a flow diagram illustrating one embodiment of a method for emulating original code into which new code is being (or has been) patched.

One embodiment of a method for emulating original code into which new code is being (or has been) patched is illustrated by the flow diagram in FIG. 5. As illustrated at 510, in this example, the method may include (e.g., during execution of code that is being patched) establishing and/or registering a trap handler for handling code traps from various locations within a redirection patch. As illustrated in this example, the method may subsequently include (e.g., during execution of the code that is being, or has been, patched) the trap handler catching a trap, as in 520. In response to the trap being taken, and if an examination of the original code (e.g., by the trap handler) indicates that it is safe to replay all of the original code that was replaced by the redirection patch (shown as the positive exit from 530), the method may include the trap handler executing all of the original code that was copied from the location of the redirection patch (i.e., the patch area), as in 540.

If, however, if an examination of the original code (e.g., by the trap handler) indicates that it is not safe to replay all of the original code that was replaced by the redirection patch (or if it cannot be determined that it is safe to replay all of the original code), the method may include the trap handler executing only the portion of the original code beginning with the entry point in the original code that corresponds to the trap taken. This is illustrated in FIG. 5 as the negative exit from 530 and 550. Various mechanisms may be employed by the trap handler to make such a determination, including, but not limited to, those described above.

In some embodiments, the code patching techniques described herein may be used to perform runtime patching of native-code programs automatically and/or periodically (e.g., to apply a code patch as part of a code debugging, code maintenance, code correction, or code upgrade operation) or when explicitly invoked by a user (e.g., a system administrator or owner). The code patching operations illustrated and described herein may be performed by a process or thread of a code patching program or module that is separate from, but that executes concurrently with various processes or threads that are executing the program or other software entity that is being patched by the code patching program or module.

Figure 6:
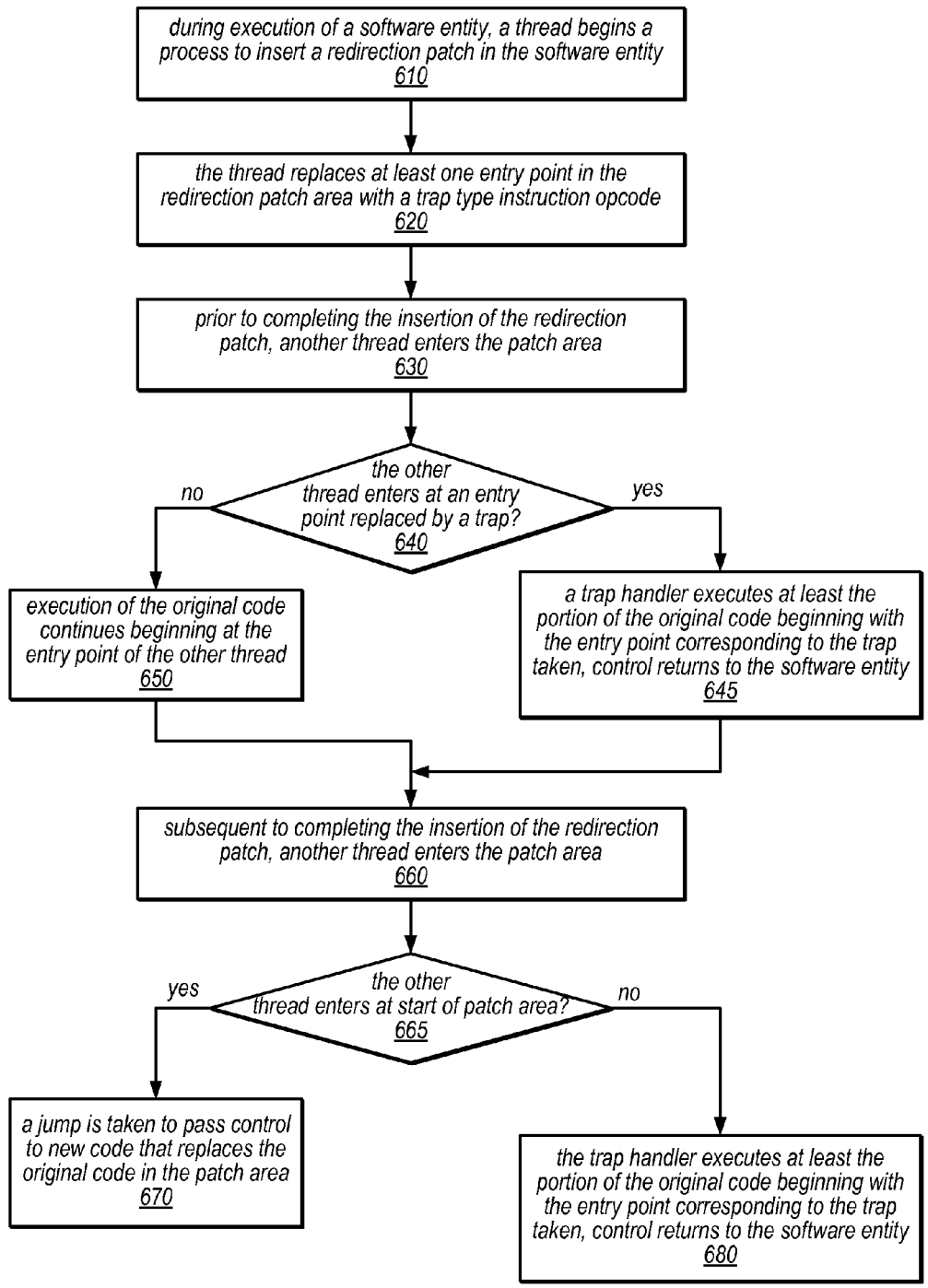
FIG. 6 is a flow diagram illustrating one embodiment of a method for employing the code patching techniques described herein.

One embodiment of a method for employing the code patching techniques described herein is illustrated by the flow diagram in FIG. 6. As illustrated at 610, in this example, the method may include, during execution of a software entity, another thread or process (e.g., a thread or process of a debugger or another software patching application, an operating system, or another type of privileged program or process) beginning a process to insert a redirection patch in the code of the executing software entity. The method may include the thread (or process) replacing at least one entry point in the redirection patch area with a trap instruction opcode (as in 620).

Prior to the insertion of the redirection patch, another thread may enter the patch area (as in 630). If the other thread entered the patch area at an entry point at which the original code has been replaced by a trap type instruction (shown as the positive exit from 640), the method may include a trap handler executing at least the portion of the original code (or, more specifically, a copy of the original code) beginning with the entry point corresponding to the trap that was taken, after which control may be returned to the executing software entity (as in 645). As described herein, the portion of the original code that is executed by the trap handler may be dependent on how the trap handler was written and/or whether it can be determined that it is safe to execute portions of the original code that precede the entry point of the other thread. Following the execution of a suitable portion of the copy of the original code by the trap handler, control may be returned back to a point in the original code following the patch area (e.g., behaving as if there had not been a patch). In this example, if the other thread enters the patch area at an entry point at which the original code has not been replaced by a trap type instruction (shown as the negative exit from 640), execution of the original code may continue beginning at the entry point of the other thread (as in 650). For example, the other thread may enter the patch area at the beginning of the patch area (e.g., at a point in time at which the original code has not yet been replaced by a jump type instruction) or at another entry point that has not yet been replaced by a trap type instruction.

As illustrated in this example, subsequent to completing the insertion of the redirection patch, another thread (e.g., the same thread or yet another thread) may enter the patch area (as in 660). If this thread did not enter the patch area at the start of patch area (shown as the negative exit from 665), it must have entered the patch area at an entry point at which the original code has been replaced by a trap. In this case, the method may include the trap handler executing (emulating) at least the portion of the original code beginning with the entry point corresponding to the trap that was taken, after which control may be returned to the executing software entity (as in 680). Here again, the portion of the original code that is executed by the trap handler may be dependent on how the trap handler was written and/or whether it can be determined that it is safe to execute portions of the original code that precede the entry point of the other thread. Following the execution of a suitable portion of the copy of the original code by the trap handler, control may be returned back to a point in the original code following the patch area (e.g., behaving as if there had not been a patch).

As illustrated in this example, if the other thread entered the patch area at the start of patch area (shown as the positive exit from 665), the method may include taking a jump (e.g., one defined by a jump type instruction that replaced the original code at the start of the patch area) to pass control to new code that replaces the original code in the patch area (as in 670).

Note that in some embodiments, the operations illustrated in elements 630-650 of FIG. 6 may be repeated one or more times while the insertion of the redirection patch is not yet complete. Similarly, the operations illustrated in elements 660, 665 and 680 may be repeated after insertion of the redirection patch has been completes (e.g., if the other thread enters the patch area at an entry point other than the beginning of the patch area) and/or the operations illustrated in elements 660, 665 and 680 may be repeated whenever a thread enters the patch area at the start of the patch area (e.g. at the location of the jump type instruction of the redirection patch) subsequent to the insertion of the redirection patch being completed.

Note that while in many of the examples described herein, the redirection patch includes a trap type instruction that, when encountered (but before it can be executed) invokes a trap handler configured to emulate the behavior of the code that was originally located in the patch area, in other embodiments, a different type of instruction (and corresponding exception handler) may be employed for a similar effect. For example, in some embodiments, an instruction may be inserted into the patch area (e.g., at a potential entry point in the patch area) that will, when executed, cause an error or exception of a type for which the response to the error or exception can be controlled (and/or the effect of the error or exception can be contained) by the automatic invocation of a suitable error or exception handler. In such embodiments, the error or exception handler may be configured to emulate the behavior of the code that was originally located in the patch area.

The code patching techniques described herein may be further illustrated by the following example code segments. In each of these examples, the binary code represents the binary code at the beginning of a function that is to be patched. In these examples, the first column contains the beginning address of a location in memory at which a binary code representation of an instruction is found in existing code, the second column contains the binary code representation of the existing instruction (shown using hex digits), the third and fourth columns collectively contain a description of the instruction (disassembled into an mnemonic for the opcode and a representation of its arguments), the fifth column contains the binary code representation of the new instruction (shown using hex digits), and the sixth and seventh columns collectively contain a description of an instruction that replaces the original instruction as a result of the code patching operation (again, disassembled into an mnemonic for the new opcode and a representation of its arguments). For example, the "New code disasm." columns show a disassembly after completion of the code patching operation, with instructions in parenthesis that would be seen by any execution threads that enter the patch area at the corresponding byte offset. In these examples, the notation "jmpq 0xaddress(% rip)" denotes a relative jump instruction in which the address needs to be added to the current rip. Note that a disassembler may typically compute the argument portion of this instruction relative to the actual code location of the succeeding instruction.

In these examples, the use of capital hex double digits (e.g., AA, BB, . . . ) in the new code disassembly column denotes variable portions of the target address argument of the corresponding jump type instruction that can be chosen freely (e.g., in order to construct a suitable target address for the jump instruction of the redirection patch).

In various ones of these examples, the code patching operation has made use of two different variants of the JMP instruction, one of which is a direct relative jump instruction and the other of which is an indirect jump for which the jump table is addressed rip relative.

| Address | Old binary | Old code disasm. | | New binary | New code disasm. | |
|---|---|---|---|---|---|---|
| # example with two bytes freedom to choose addresses (BB, AA), | | | | | | |
| # 32bit signed relative, direct jump | | | | | | |
| 4012ab: | 53 | push | %rbx | e9 | jmpq | 0xBBccAAcc(%rip) |
| 4012ac: | 31 f6 | xor | %esi,%esi | cc AA | (int3) | |
| 4012ae: | 48 89 fb | mov | %rdi,%rbx | cc BB CC | (int3) | |
| 4012b1: | 48 83 ec 10 | sub | $0x10,%rsp | 48 83 ec 10 | sub | $0x10,%rsp |
| . . . | | | | | | |

| Address | Old binary | Old code disasm. | | New binary | New code disasm. | |
|---|---|---|---|---|---|---|
| # example with three bytes freedom to choose addresses (CC, BB, AA), | | | | | | |
| # absolute indirect jump, rip-relative jump-table addressing | | | | | | |
| 4012d3: | 48 83 ec 18 | sub | $0x18,%rsp | ff 25 AA BB | jmpq | *0xCCccBBAA(%rip) |
| 4012d7: | 48 89 e7 | mov | %rsp,%rdi | cc CC DD | (int3) | |
| . . . | | | | | | |

| Address | Old binary | Old code disasm. | | New binary | New code disasm. | |
|---|---|---|---|---|---|---|
| # example with three bytes freedom to choose addresses (CC, BB, AA), | | | | | | |
| # 32bit signed relative, direct jump | | | | | | |
| 4012ff: | 48 83 ec 18 | sub | $0x18,%rsp | e9 AA BB CC | jmpq | 0x0fCCBBAA(%rip) |
| 401303: | 31 f6 | xor | %esi,%esi | 0f 0b | (ud2) | |
| 401305: | 48 8d 7c 24 08 | lea | 0x8(%rsp),%rdi | 48 8d 7c 24 08 | lea | 0x8(%rsp),%rdi |
| . . . | | | | | | |

| Address | Old binary | Old code disasm. | | New binary | New code disasm. | |
|---|---|---|---|---|---|---|
| # example with four bytes freedom (full) to choose addresses (DD, CC, BB, AA), | | | | | | |
| # 32bit signed relative, direct jump | | | | | | |
| 401317: | 4881ec98000000 | sub | $0x98,%rsp | e9AABBCCDDEEFF | jmpq | 0xDDCCBBAA(%rip) |
| 40131e: | 31 c0 | xor | %eax,%eax | 31c0 | xor | %eax,%eax |
| . . . | | | | | | |

Additional examples of the use of jump type instructions in redirection patches are illustrated by the code snippets below.

| | | | | |
|---|---|---|---|---|
| 400476: | ff 25 7c 0b 20 00 | jmpq | *0x200b7c(%rip) | #600ff8 <TABLE_+0x10> |
| 40048b: | e9 e0 ff ff ff | jmpq | 400470 <_init+0x18> | |
| 400c73: | eb 62 | jmp | 400cd7 <main+0x207> | |

Note that although several examples illustrated and described herein involve the patching of binary code for programs that are executable in systems that support an x86 type instruction set architecture, in other embodiments, these techniques may be applied when performing runtime patching of native-code programs that are executable in systems that support other instruction set architectures. In various embodiments, the techniques described herein for performing runtime patching of native-code may be applied to perform any of a variety of types of binary hot-patching, including, but not limited to, those described herein. For example, in some embodiments they may be employed in the area of kernel and/or hypervisor hot-patching (where, e.g., having to halt and/or restart the program in order to perform code patching is especially undesirable). In other embodiments, these code patching techniques may be employed in hot-patching for other types programs (including various client or server applications). In general, these techniques may be applicable for performing runtime code patching for any software entity that is compiled to a native-code representation, although they may be especially well suited for performing runtime code patching for any software entity for which the instruction set encodings are of variable lengths.

Figure 7:
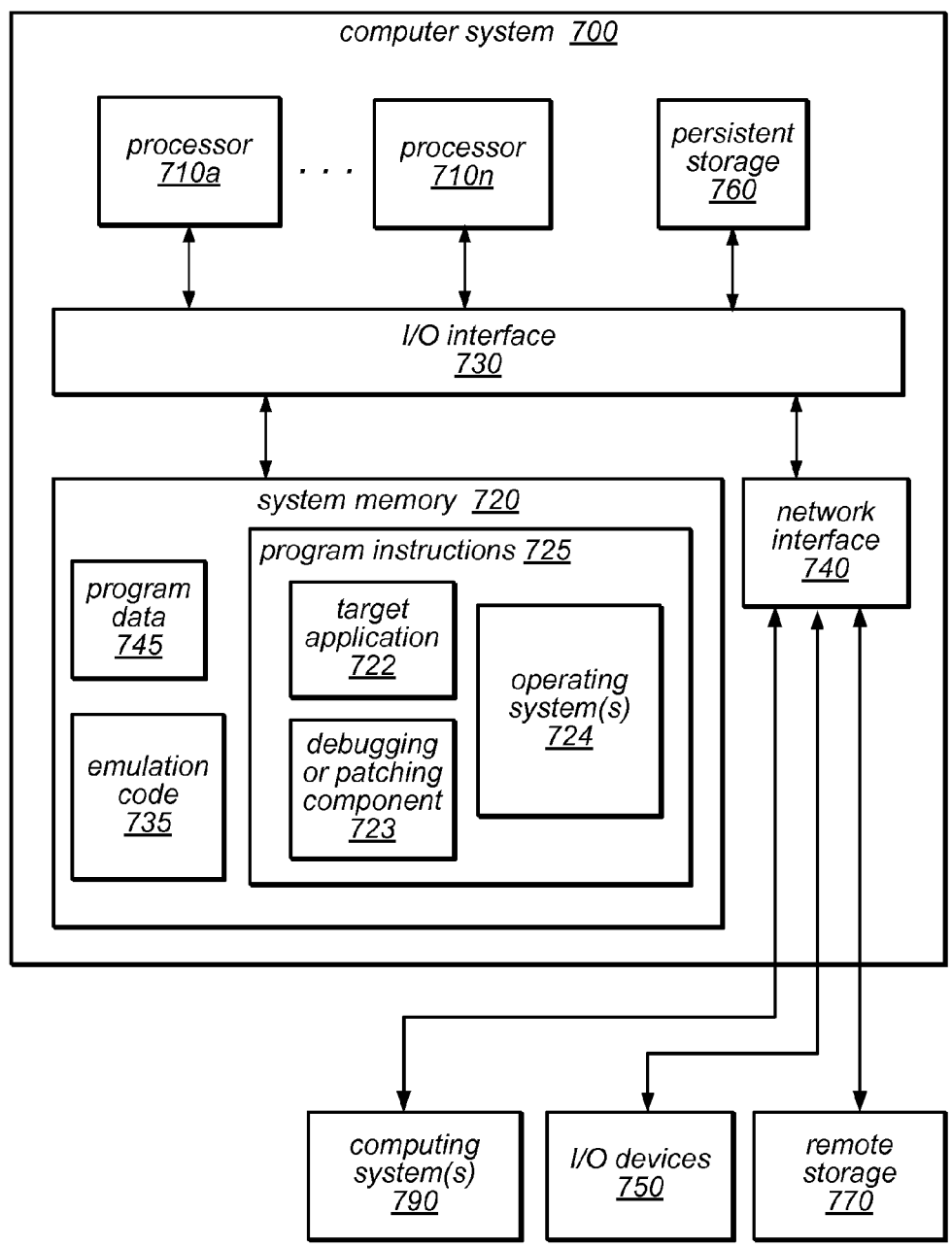
FIG. 7 is a block diagram illustrating a computer system configured to implement the code patching techniques described herein, according to various embodiments.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement any or all of the functionality described herein for patching native-code programs, such as binary code representations of software programs. FIG. 7 is a block diagram illustrating a computer system configured to implement the code patching techniques described herein, according to various embodiments. Computer system 700 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 700 includes one or more processors 710 (any of which may include multiple cores, which may be single or multi-threaded) coupled to a system memory 720 via an input/output (I/O) interface 730. Computer system 700 further includes a network interface 740 coupled to I/O interface 730. In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA. The computer system 700 also includes one or more network communication devices (e.g., network interface 740) for communicating with other systems and/or components over a communications network (e.g. Internet, LAN, etc.). For example, a client application executing on system 700 may use network interface 740 to communicate with a server application executing on a single server or on a cluster of servers that implement a distributed system. In another example, an instance of a server application executing on computer system 700 may use network interface 740 to communicate with a client application and/or with other instances of the server application that may be implemented on other computer systems.

In the illustrated embodiment, computer system 700 also includes one or more persistent storage devices 760. In various embodiments, persistent storage devices 760 may correspond to disk drives, tape drives, solid state memory, other mass storage devices, or any other persistent storage device. Computer system 700 (or an application, software component, or operating system operating thereon) may store instructions and/or data in persistent storage devices 760, as desired, and may retrieve the stored instruction and/or data as needed.

Computer system 700 includes one or more system memories 720 that are configured to store instructions and data accessible by processor 710. In various embodiments, system memories 720 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 720 may contain program instructions 725 that are executable by processor(s) 710 to implement the methods and techniques described herein (e.g., executing a target application, determining various parameters of a redirection patch to be inserted in the target application, inserting the redirection patch into the target application and/or emulating code that is replaced by the redirection patch). In various embodiments, program instructions 725 may be encoded in platform native binary, any interpreted language such as Java™ byte-code, or in any other language such as C/C++, Java™, etc., or in any combination thereof. For example, in the illustrated embodiment, program instructions 725 include program instructions executable to implement target application 722, debugging or code patching component 723, and/or operating system(s) 724, which may include any of various operating systems, such as UNIX, LINUX, Solaris™, MacOS™, Windows™, etc.

Any or all of program instructions 725, including target application 722, operating system(s) 724, and debugging or code patching component 723 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 700 via I/O interface 730. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 740.

In some embodiments, system memory 720 may include storage for program data 745 and/or for emulation code 735 (which may include, for example, code that is executable to implement an trap handler and/or copies of various portions of the original code of target application 722 that is being, or has been, replaced by a redirection patch), as described herein. In various embodiments, system memory 720 (e.g., program data 745 within system memory 720) and/or remote storage 770 may store various jump tables, trampoline code, representations of new code to be patched into target application 722, and/or any other information usable in implementing the methods and techniques described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as other computer systems 790 (which may implement one or more server nodes and/or clients of a distributed system), for example. In addition, network interface 740 may be configured to allow communication between computer system 700 and various I/O devices 750 and/or remote storage 770. Input/output devices 750 may, in some embodiments, include one or more display terminals, keyboards, keypads, touchpads, scanning devices, voice or optical recognition devices, or any other devices suitable for entering or retrieving data by one or more computer systems 700. Multiple input/output devices 750 may be present in computer system 700 or may be distributed on various nodes of a distributed system that includes computer system 700. In some embodiments, similar input/output devices may be separate from computer system 700 and may interact with one or more nodes of a distributed system that includes computer system 700 through a wired or wireless connection, such as over network interface 740. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol. In various embodiments, computer system 700 may include more, fewer, or different components than those illustrated in FIG. 7 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
performing, by one or more computers:
during execution of an existing binary code representation of a software program located in a memory:
identifying a patch area in the existing binary code representation, wherein the patch area comprises a portion of the existing binary code representation that is to be replaced in the memory with a binary code representation of a redirection patch, and wherein a redirection patch is a patch that comprises a jump type instruction and a target address argument for the jump type instruction;
copying the portion of the existing binary code representation in the patch area from its location in the memory to another location in the memory, wherein the copy of the portion of the existing binary code representation in the other location in the memory is executable by a trap handler;
determining the target address argument for the jump type instruction that is to be included in the redirection patch, wherein said determining is dependent, at least in part, on one or more characteristics of the existing binary code representation of the software program; and
inserting the binary code representation of the redirection patch comprising the jump type instruction and the determined target address argument for the jump type instruction in the location of the patch area in the memory.

2. The method of claim 1,
wherein said determining the target address argument for the jump type instruction comprises determining that the patch area comprises binary code representations of two or more instructions; and
wherein said inserting comprises replacing each of one or more binary code elements within the patch area in the memory that correspond to an instruction start boundary with a binary code representation of a trap type instruction whose execution triggers execution of the trap handler.

3. The method of claim 2, wherein said inserting further comprises replacing each of one or more binary code elements within the patch area in the memory that do not correspond to an instruction start boundary with an arbitrary value, so that the target address argument for the jump type instruction comprises one or more binary code representations of trap type instructions and one or more arbitrary values.

4. The method of claim 1,
wherein said determining the target address argument for the jump type instruction comprises determining that the patch area comprises one or more code entry points other than an entry point at the start of the patch area; and wherein said inserting comprises replacing one or more binary code elements of at least one of the one or more code entry points with a binary code representation of a trap type instruction whose execution triggers execution of the trap handler.

5. The method of claim 4, wherein each of the at least one of the one or more code entry points is a target of a return type operation, a target of a jump type instruction, or a target of a branch type instruction.

6. A system, comprising:
one or more processors; and
a memory coupled to the one or more processors;
wherein the memory stores native-code program instructions executable by the one or more processors to implement at least a portion of an application;
wherein the memory stores program instructions executable by the one or more processors to implement a code patching component; and
wherein during execution of the application and the code patching component, the code patching component is configured to:
identify a patch area in the native-code program instructions, wherein the patch area comprises a sequence of native-code elements within the native-code program instructions that is to be replaced in the memory with another sequence of native-code elements, wherein the other sequence of native-code elements is executable by the one or more processors to implement a redirection patch, and wherein a redirection patch is a patch that comprises a jump type instruction and a target address argument for the jump type instruction;
determine the target address argument for the jump type instruction that is to be included in the redirection patch dependent, at least in part, on one or more characteristics of the native-code program instructions; and
insert the other sequence of native-code elements in the location of the patch area in the memory, wherein the other sequence of native-code elements comprises native-code elements representing the jump type instruction and native-code elements representing the determined target address argument for the jump type instruction.

7. The system of claim 6,
wherein to determine the target address argument for the jump type instruction, the code patching component is configured to determine the number of program instructions or code entry points that are represented by the sequence of native-code elements in the patch area; and
wherein to insert the other sequence of native-code elements in the location of the patch area in the memory, the code patching component is configured to overwrite the sequence of native-code elements in the location of the patch area in the memory with the other sequence of native-code elements.

8. The system of claim 6, wherein to insert the other sequence of native-code elements in the location of the patch area in the memory, the code patching component is configured to replace at least some of the native-code elements in the location of the patch area in the memory other than native-code elements replaced by the native-code elements representing the jump type instruction with native-code elements representing a trap type instruction whose execution triggers execution of a trap handler, with native-code elements representing a no-operation (NOP) type instruction, or with an arbitrary value, so that the target address argument for the jump type instruction comprises one or more of: a native-code element other than the native-code elements replaced by the native-code elements representing the jump type instruction that remains in the location of the patch area in the memory, a native-code representation of a trap type instruction, a native-code representation of a no-operation (NOP) type instruction, or an arbitrary value.

9. The system of claim 6,
wherein the code patching component is further configured to write a new sequence of native-code program instructions in the memory beginning at a location that is directly or indirectly addressable using the target address argument for the jump type instruction; and
wherein, subsequent to the insertion, a process or thread of the application is configured to:
enter the patch area; and
execute the jump type instruction of the redirection patch; and
execute the new sequence of native-code program instructions rather than the sequence of native-code elements that was previously within the native-code program instructions in the patch area.

10. The system of claim 9, wherein to determine the target address argument for the jump type instruction, the code patching component is configured to:
determine that the location in the memory at which the new sequence of native-code program instructions begins cannot be reached directly using a target address argument of the jump type instruction; and
in response to determining that the location in the memory at which the new sequence of native-code program instructions begins cannot be reached directly using a target address argument of the jump type instruction, determine a target address argument usable to indirectly address the location in the memory at which the new sequence of native-code program instructions begins.

11. The system of claim 10, wherein to determine a target address argument usable to indirectly address the location in the memory at which the new sequence of native-code program instructions begins, the code patching component is configured to determine a target address argument usable to access a register, a jump table, or a sequence of native-code program instructions comprising native-code program instructions representing a second jump type instruction.

12. The system of claim 6,
wherein the code patching component is further configured to:
copy the sequence of native-code elements within the native-code program instructions in the patch area from its location in the memory to another location in the memory, wherein the copy of the sequence of native-code elements within the native-code program instructions in the other location in the memory is executable by a trap handler; and
install the trap handler;
wherein, prior to completing the insertion, a process or thread of the application is configured to:
enter the patch area; and
execute a trap type instruction within the redirection patch; and
wherein in response to the process or thread of the application executing the trap type instruction, the trap handler is configured to:
execute at least a portion of the copy of the sequence of native-code elements within the native-code program instructions in the other location.

13. A non-transitory computer-readable storage medium storing program instructions that when executed on one or more computers cause the one or more computers to perform:
during execution of an existing native-code representation of a process or thread located in a memory:
identifying a patch area in the existing native-code representation, wherein the patch area comprises a portion of the existing native-code representation that is to be replaced in the memory with a native-code representation of a redirection patch, and wherein a redirection patch is a patch that comprises a jump type instruction and a target address argument for the jump type instruction;
determining the target address argument for the jump type instruction that is to be included in the redirection patch, wherein said determining is dependent, at least in part, on one or more characteristics of the existing native-code representation of the process or thread; and
inserting the native-code representation of the redirection patch comprising the jump type instruction and the determined target address argument for the jump type instruction in the location of the patch area in the memory.

14. The non-transitory computer-readable storage medium of claim 13,
wherein said determining the target address argument for the jump type instruction comprises determining that the patch area comprises a native-code representation of a single instruction; and
wherein said inserting comprises overwriting the native-code representation of the single instruction in the location of the patch area in the memory with the native-code representation of the redirection patch.

15. The non-transitory computer-readable storage medium of claim 13, wherein said overwriting is performed atomically.

16. The non-transitory computer-readable storage medium of claim 13,
wherein said determining the target address argument for the jump type instruction comprises determining that the patch area comprises one or more code entry points other than an entry point at the start of the patch area; and
wherein said inserting comprises replacing one or more native-code elements of at least one of the one or more code entry points with a native-code representation of a trap type instruction whose execution triggers execution of a trap handler.

17. The non-transitory computer-readable storage medium of claim 16, wherein when executed on the one or more computers, the program instructions further cause the one or more computers to perform:
copying the portion of the existing native-code representation in the patch area from its location in the memory to another location in the memory, wherein the copy of the portion of the existing native-code representation in the other location in the memory is executable by a trap handler; and
installing the trap handler.

18. The non-transitory computer-readable storage medium of claim 17,
wherein said determining the target address argument for the jump type instruction further comprises determining that it is safe for the trap handler to execute all of the code in the copy of the portion of the existing native-code representation in the other location in the memory in response to entering the patch area at any of the one or more code entry points; and
wherein said inserting comprises replacing one or more native-code elements of at least one of the code entry points with a native-code representation of a no-operation (NOP) type instruction.

19. The non-transitory computer-readable storage medium of claim 13, wherein said inserting comprises replacing each of one or more native-code elements within the location of the patch area in the memory other than native-code elements replaced by native-code elements representing the jump type instruction with native-code elements representing a trap type instruction whose execution triggers execution of a trap handler, with native-code elements representing a no-operation (NOP) type instruction, or with an arbitrary value, so that the target address argument for the jump type instruction comprises one or more of: a native-code element other than the native-code elements replaced by the native-code elements representing the jump type instruction that remains in the location of the patch area in the memory, a native-code representation of a trap type instruction, a native-code representation of a no-operation (NOP) type instruction, or an arbitrary value.

20. The non-transitory computer-readable storage medium of claim 13, wherein when executed on the one or more computers, the program instructions further cause the one or more computers to perform:
writing a new sequence of native-code program instructions in the memory beginning at a location that is directly or indirectly addressable using the target address argument for the jump type instruction;
determining that the location in the memory at which the new sequence of native-code program instructions begins cannot be reached directly using a target address argument of the jump type instruction; and
in response to determining that the location in the memory at which the new sequence of native-code program instructions begins cannot be reached directly using a target address argument of the jump type instruction, determining a target address argument usable to indirectly address the location in the memory at which the new sequence of native-code program instructions begins, wherein said determining a target address argument usable to indirectly address the location in the memory at which the new sequence of native-code program instructions begins comprises determining a target address argument usable to access a register, a jump table, or a sequence of native-code program instructions comprising native-code program instructions representing a second jump type instruction.

* * * * *